(12) United States Patent
Nakayama

(10) Patent No.: US 7,453,500 B2
(45) Date of Patent: Nov. 18, 2008

(54) IMAGE SENSING APPARATUS, WHITE BALANCE ADJUSTING METHOD, AND OPERATION PROCESSING PROGRAM THEREFOR

(75) Inventor: Satoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 703 days.

(21) Appl. No.: 10/214,979

(22) Filed: Aug. 7, 2002

(65) Prior Publication Data
US 2003/0030730 A1 Feb. 13, 2003

(30) Foreign Application Priority Data
Aug. 9, 2001 (JP) .............................. 2001-242014

(51) Int. Cl.
*H04N 9/73* (2006.01)
(52) U.S. Cl. .................................. 348/224.1
(58) Field of Classification Search ............... 348/224.1, 348/223.1, 227.1, 228.1
See application file for complete search history.

(56) References Cited

U.S. PATENT DOCUMENTS

| 4,989,093 A * | 1/1991 | Kaneko .................... 348/224.1 |
| 5,099,316 A | 3/1992 | Ogawa |
| 5,568,187 A | 10/1996 | Okino |
| 5,617,139 A | 4/1997 | Okino |
| 6,081,076 A * | 6/2000 | Ogawa .................... 315/241 P |
| 6,160,579 A * | 12/2000 | Shiraiwa et al. .......... 348/224.1 |
| 6,522,353 B1 * | 2/2003 | Saito et al. ............... 348/223.1 |
| 2002/0027601 A1 * | 3/2002 | Nakayama et al. .......... 348/223 |
| 2003/0184660 A1 * | 10/2003 | Skow ...................... 348/223.1 |

FOREIGN PATENT DOCUMENTS

| JP | B8-17498 | 5/1989 |
| JP | 8-126022 | 5/1996 |
| JP | 11-331854 | 11/1999 |

* cited by examiner

*Primary Examiner*—David L Ometz
*Assistant Examiner*—Nicholas G Giles
(74) *Attorney, Agent, or Firm*—Morgan & Finnegan, LLP

(57) ABSTRACT

This invention is to provide an image sensing apparatus capable of improving white balance adjustment when an electronic flash device is used. In order to achieve this object, the image sensing apparatus has a control device for acquiring a first control value, acquiring a second control value by applying the first control value to a predetermined function, and adjusting the white balance of an image signal to be output from an image sensing device on the basis of the first and second control values.

6 Claims, 6 Drawing Sheets

IMAGE SENSING APPARATUS, WHITE BALANCE ADJUSTING METHOD, AND OPERATION PROCESSING PROGRAM THEREFOR

FIELD OF THE INVENTION

The present invention relates to an image sensing apparatus having an illumination device such as an electronic flash device.

BACKGROUND OF THE INVENTION

To photograph an object with a low illuminance or an object illuminated with back light, an image sensing apparatus must use an electronic flash device.

White balance is adjusted in accordance with the color temperature of an object. In photographing an object using an electronic flash device, white balance must be determined in consideration of both the color temperature of the object and that of the electronic flash. As a method of determining white balance, a white balance control value is calculated on the basis of the illuminance of an object and the degree of influence of the light emission amount of an electronic flash device.

However, as can be understood from the graph in FIG. 6 which shows the white balance control characteristic for R and B signals, if a white balance control value to be actually controlled is simply calculated on the basis of the illuminance of an object and the degree of influence of the light emission amount of an electronic flash device in accordance with the ratio of the white balance control value for the color temperature of the object before illumination to the white balance control value for a color temperature based on the light emission amount of the electronic flash device, the calculated white balance control value deviates from a black body radiation characteristic indicated by the bold line.

As a result, if white balance is adjusted on the basis of the thus calculated white balance control value, the image exhibits color appearance little to magenta.

SUMMARY OF THE INVENTION

The present invention has been made to solve the above-described problem, and has as its object to provide an image sensing apparatus capable of improving white balance adjustment when an electronic flash device is used.

In order to achieve the above-described object, according to the present invention, there is provided an image sensing apparatus characterized by comprising a control device which acquires a first control value on the basis of a light emission amount of an illumination device which illuminates an object and an illuminance of the object before illuminated by the illumination device, acquires a second control value by applying the first control value to a predetermined function, and adjusts white balance of an image signal to be output from an image sensing device on the basis of the first and second control values.

There is also provided a white balance adjusting method characterized in that a first control value is acquired on the basis of a light emission amount of an illumination device which illuminates an object and an illuminance of the object before illuminated by the illumination device, a second control value is acquired by applying the first control value to a predetermined function, and white balance of an image signal to be output from an image sensing device is adjusted on the basis of the first and second control values.

There is also provided an operation processing program for executing processing of acquiring a first control value on the basis of a light emission amount of an illumination device which illuminates an object and an illuminance of the object before illuminated by the illumination device, acquiring a second control value by applying the first control value to a predetermined function, and adjusting white balance of an image signal to be output from an image sensing device on the basis of the first and second control values.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The embodiment of the present invention will be described below with reference to the accompanying drawings.

Figure 2:
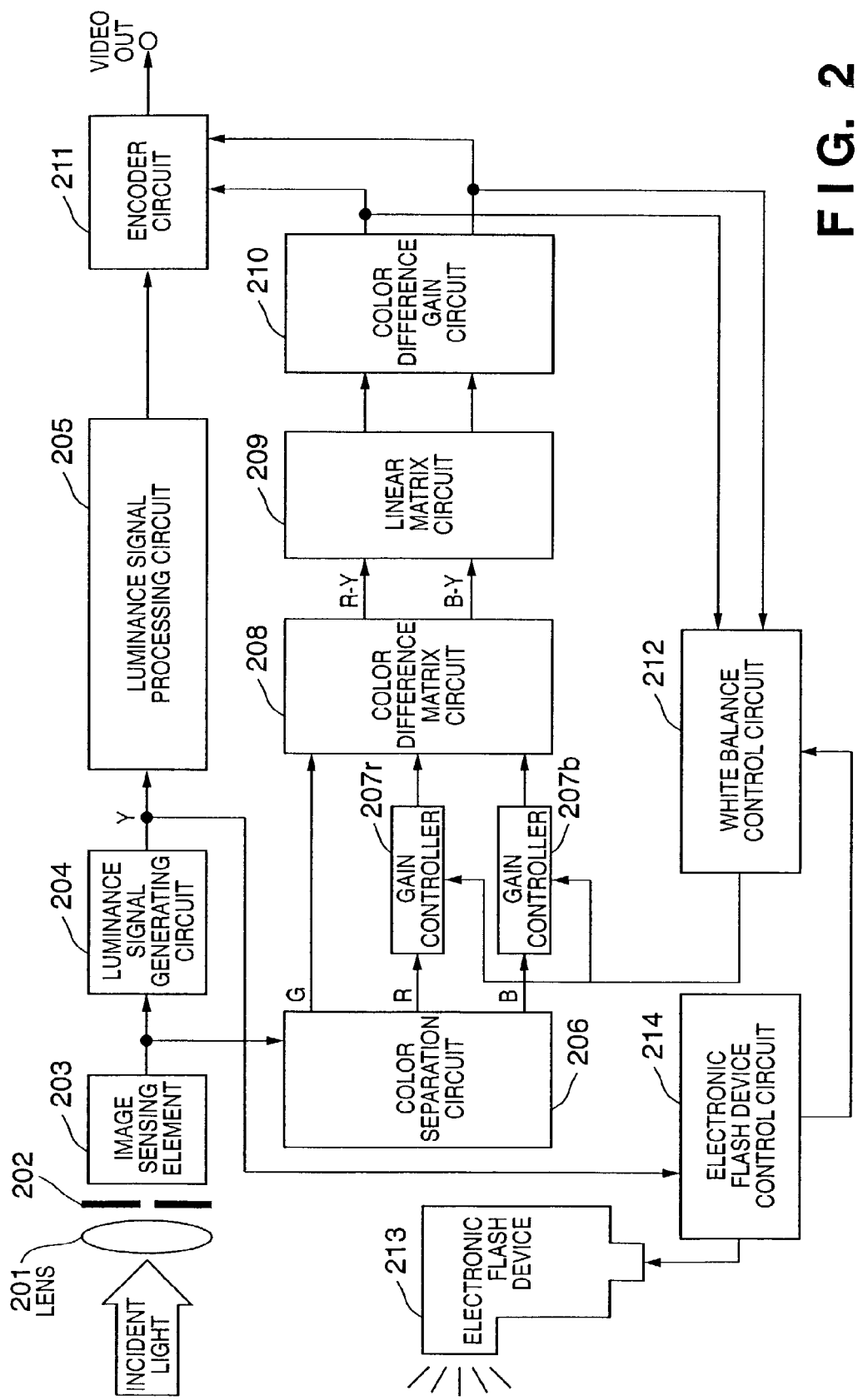
FIG. 2 is a block diagram of an image sensing apparatus of the embodiment.

FIG. 2 is a block diagram of an image sensing apparatus of this embodiment.

Referring to FIG. 2, a lens optical system 201 has a focus lens and zoom lens. An optical stop 202 suppresses incidence of object light. An image sensing element 203 made of a CCD or the like converts object light that is incident through the lens optical system 201 and optical stop 202 into an electrical image signal.

A luminance signal generating circuit 204 generates a luminance signal from the image signal obtained by the image sensing element 203. A luminance signal processing circuit 205 executes γ correction or edge enhancement for the luminance signal generated by the luminance signal generating circuit 204.

A color separation circuit 206 generates three chrominance signals, i.e., R, G, and B signals from the image signal obtained by the image sensing element 203. A white balance amplifier 207r changes the gain of the R signal. A white balance amplifier 207b changes the gain of the B signal. White balance is adjusted by these white balance amplifiers 207r and 207b. A color difference matrix circuit 208 generates color difference signals R-Y and B-Y from the R and B signals adjusted by the white balance amplifiers 207r and 207b and the G signal. A linear matrix circuit 209 adjusts the hues of the color difference signals R-Y and B-Y. A color difference gain circuit 210 controls the gains of the color difference signals R-Y and B-Y to adjust the color saturation.

An encoder circuit 211 generates a video signal from the luminance signal and color difference signals. A white balance control circuit 212 acquires the color temperature information of the object (external light) on the basis of the color difference signals output from the color difference gain circuit 210. The white balance control circuit 212 also acquires information related to the light emission timing and light emission amount of an electronic flash device 213. On the basis of these pieces of information, the white balance control circuit 212 controls the white balance amplifiers 207r and 207b, thereby adjusting the white balance. The electronic flash device 213 illuminates the object under the control of an electronic flash device control circuit 214. The electronic flash device control circuit 214 detects the illuminance of the object on the basis of the luminance signal generated by the luminance signal generating circuit 204. The electronic flash device control circuit 214 also detects the object distance from a detection circuit (not shown) for detecting the object distance. The electronic flash device control circuit 214 controls the light emission amount of the electronic flash device 213 on the basis of the detected illuminance and object distance of the object.

Figure 1:
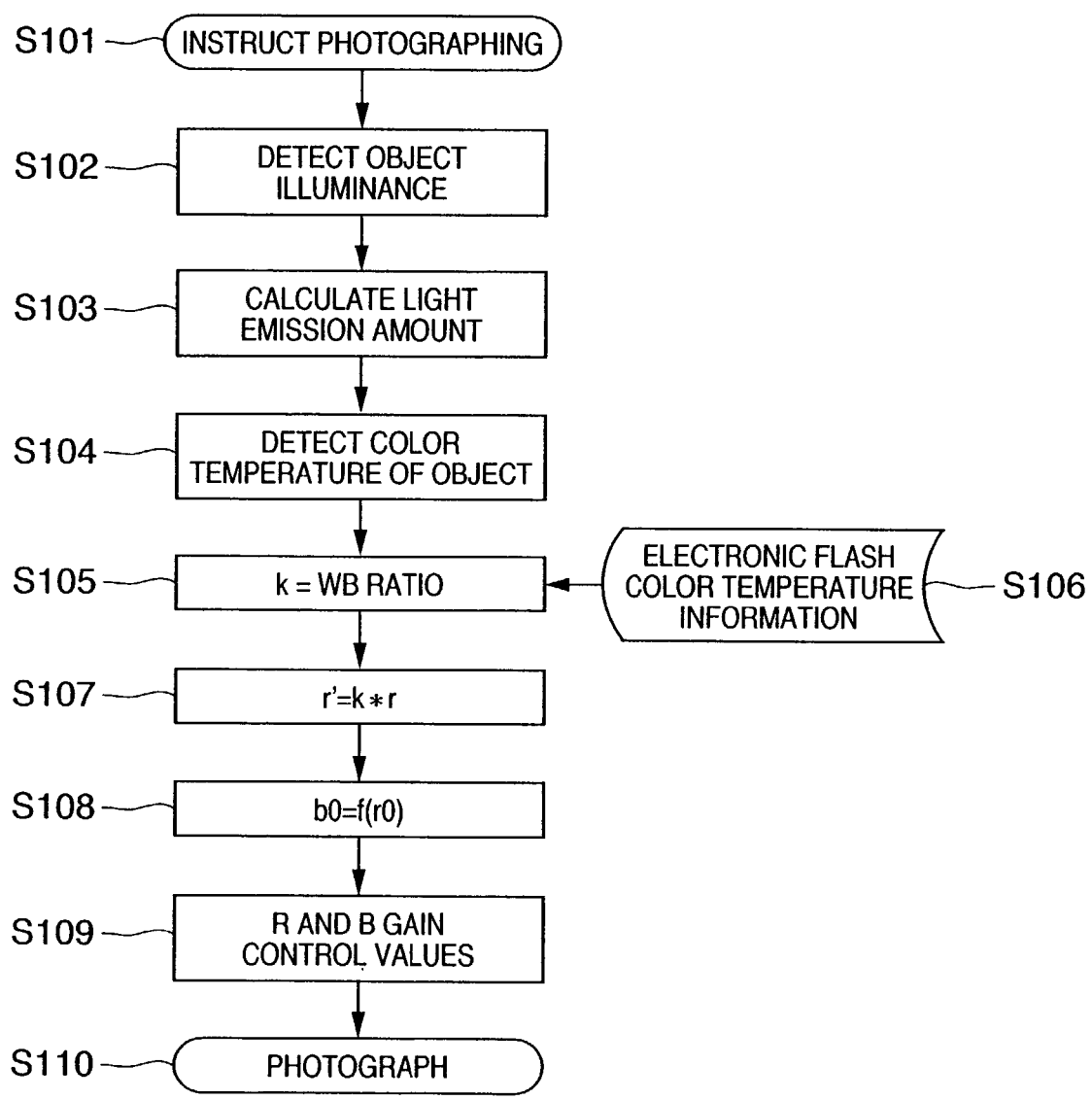
FIG. 1 is a flow chart showing operation processing for white balance adjustment in the embodiment.
Figure 3:
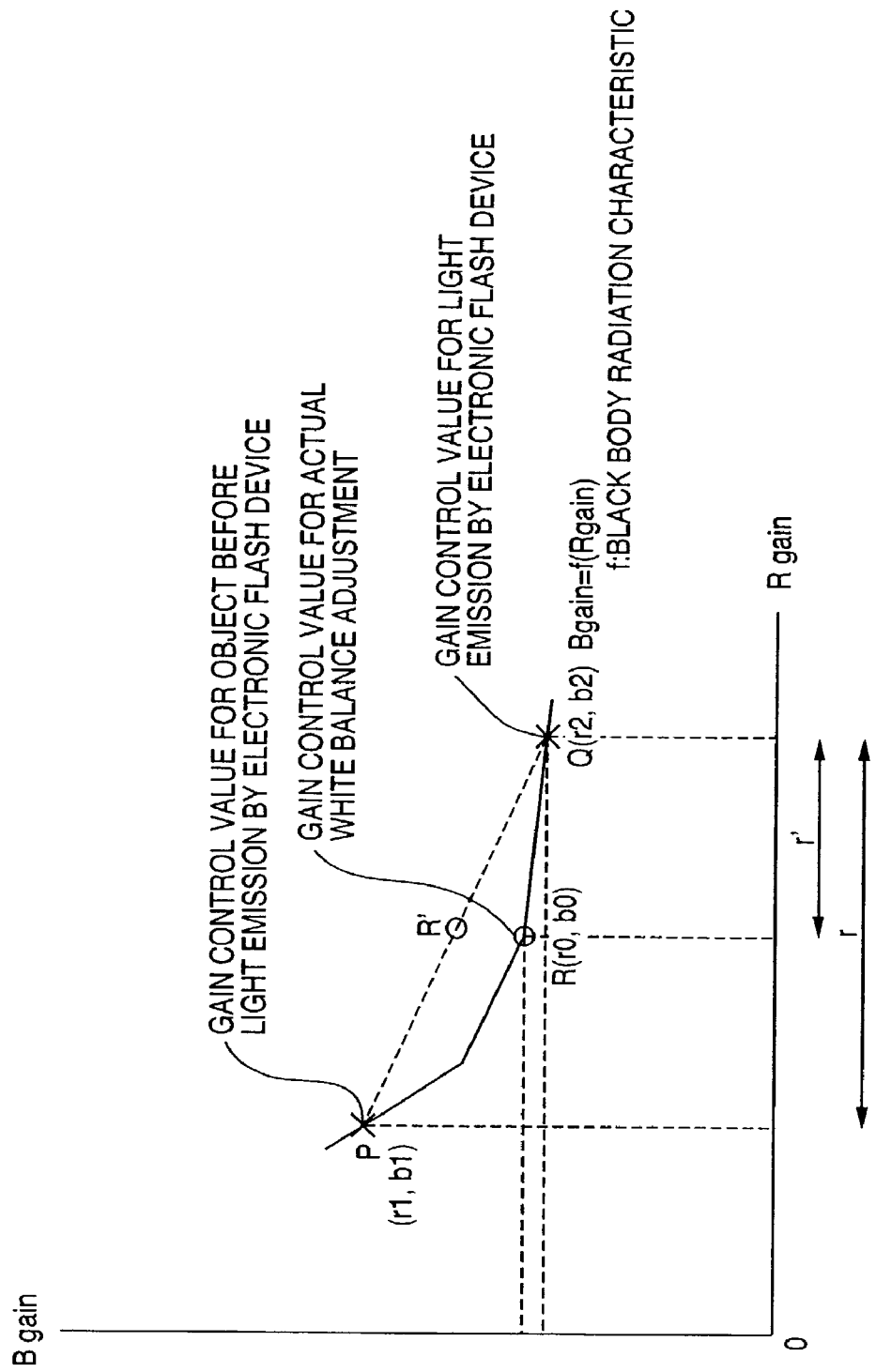
FIG. 3 is a graph showing the correlation of gain control values for R and B signals so as to explain a process of calculating gain control values for actual white balance adjustment.

FIG. 1 is a flow chart used to execute white balance adjustment when a still image is photographed using the electronic flash device 213 in the image sensing apparatus of this embodiment. FIG. 3 is a graph showing the correlation of gain control values for R and B signals so as to explain a process of calculating gain control values for actual white balance adjustment in this embodiment.

First, in step S101, the photographer instructs photographing of a still image using an operation member (not shown). In step S102 the electronic flash device control circuit 214 detects the illuminance of the object on the basis of the luminance signal output from the luminance signal generating circuit 204. The flow advances to step S103. The electronic flash device control circuit 214 calculates the light emission amount to be generated by the electronic flash device 213 on the basis of the detected illuminance of the object.

In step S104, the white balance control circuit 212 acquires information related to the light emission amount of the electronic flash device 213, which is calculated by the electronic flash device control circuit. The white balance control circuit 212 acquires the color temperature information of the object (external light) on the basis of color difference signals output from the color difference gain circuit 210 before light emission by the electronic flash device 213 and calculates gain control values P(r1,b1) for the R and B signals on the basis of these pieces of information.

In step S106, the color temperature information of light to be emitted from the electronic flash device 213, which corresponds to the light emission amount of the electronic flash device 213, is extracted from a table (not shown), and gain control values Q(r2,b2) for the R and B signals are calculated, as in step S104.

In step S105, a WB ratio k (the ratio of gain control values to be controlled: 0<k<1) which represents the degree of influence of the color temperature of light to be emitted from the electronic flash device 213 on the color temperature of the object is calculated from the illuminance of the object before light emission and the light emission amount of the electronic flash device 213. For the degree of influence of the color temperature of light, the relationship between the illuminance of an object and the light emission amount of the electronic flash device 213 is experimentally obtained in advance and stored in a table (not shown).

In step S107, a gain control value for actual white balance adjustment is calculated on the basis of the WB ratio k and one of the gain control values for the R and B signals, which are obtained in steps S104 and S106. For example, assume that a gain control value for actual white balance adjustment is to be calculated in association with the gain control value for the R signal. Since r=|r2−r1| and r'=|r2−r0|, a gain control value r' for the R signal, which is shifted from the gain control value Q, can be calculated from $$r : r' = 1 : k \quad (1)$$

as $$r' = k * r \quad (2)$$

Thus, a gain control value r0 for the R signal for actual white balance adjustment is calculated.

In step S108, a gain control value b0 for the other chrominance signal, i.e., the B signal is obtained. In step S108, instead of using calculation for obtaining the gain control value r0 in step S107, the gain control value r' obtained in step S107 is applied to a function f corresponding to a black body radiation approximate characteristic (bold line), thereby obtaining the gain control value b0. That is, $$b0 = f(r0) \quad (3)$$

Thus, the gain control value b0 for the B signal for actual white balance adjustment is calculated. In this embodiment, for the function f, a gain control value b approximated to a black body radiation characteristic corresponding to the gain control value r is stored in a lookup table.

In step S109, gain control values R(r0,b0) obtained in steps S107 and S108 are output to the white balance amplifiers 207r and 207b.

In step S110, the still image is photographed using light emission by the electronic flash device 213, and white balance is adjusted using the gain control values R.

As described above, in photographing using the electronic flash device 213, when the gain control value for the B signal is calculated on the black body radiation characteristic, photographing can be executed with optimum white balance for every electronic flash photographing (if the gain control value for the B signal is obtained in step S108 in accordance with the same procedure as that of the gain control value for the R signal in step S107, the gain control value changes to R' in FIG. 3, and the white balance becomes close to magenta).

In the above-described embodiment, the gain control value for the actual R signal is obtained first. However, the gain control value for the B signal may be obtained first.

Additionally, in steps S104 and S106, gain control values for only one of the R and B signals may be calculated.

White balance adjustment when the electronic flash device 213 is caused to emit light under artificial illumination will be described next. In the flow chart of FIG. 1, the color temperature of an object light source is located on a black body radiation. However, artificial illumination such as a fluorescent lamp has a special spectrum different from that of natural light. The color temperature of external light under such artificial illumination may deviate from the black body radiation characteristic. White balance control in photographing using an electronic flash device under such artificial illumination will be described below.

Figure 4:
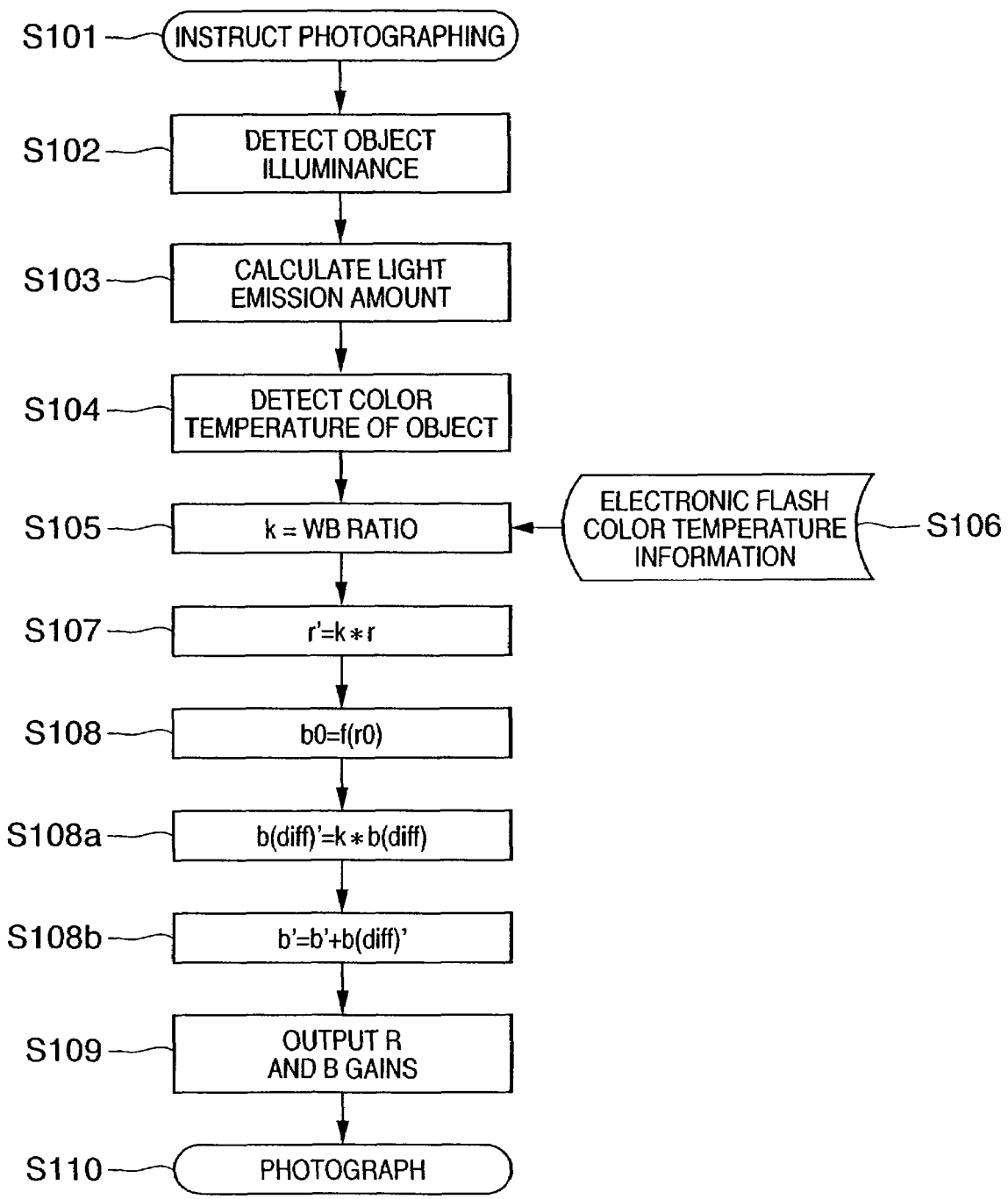
FIG. 4 is a flow chart showing operation processing for white balance adjustment under artificial illumination such as a fluorescent lamp.
Figure 5:
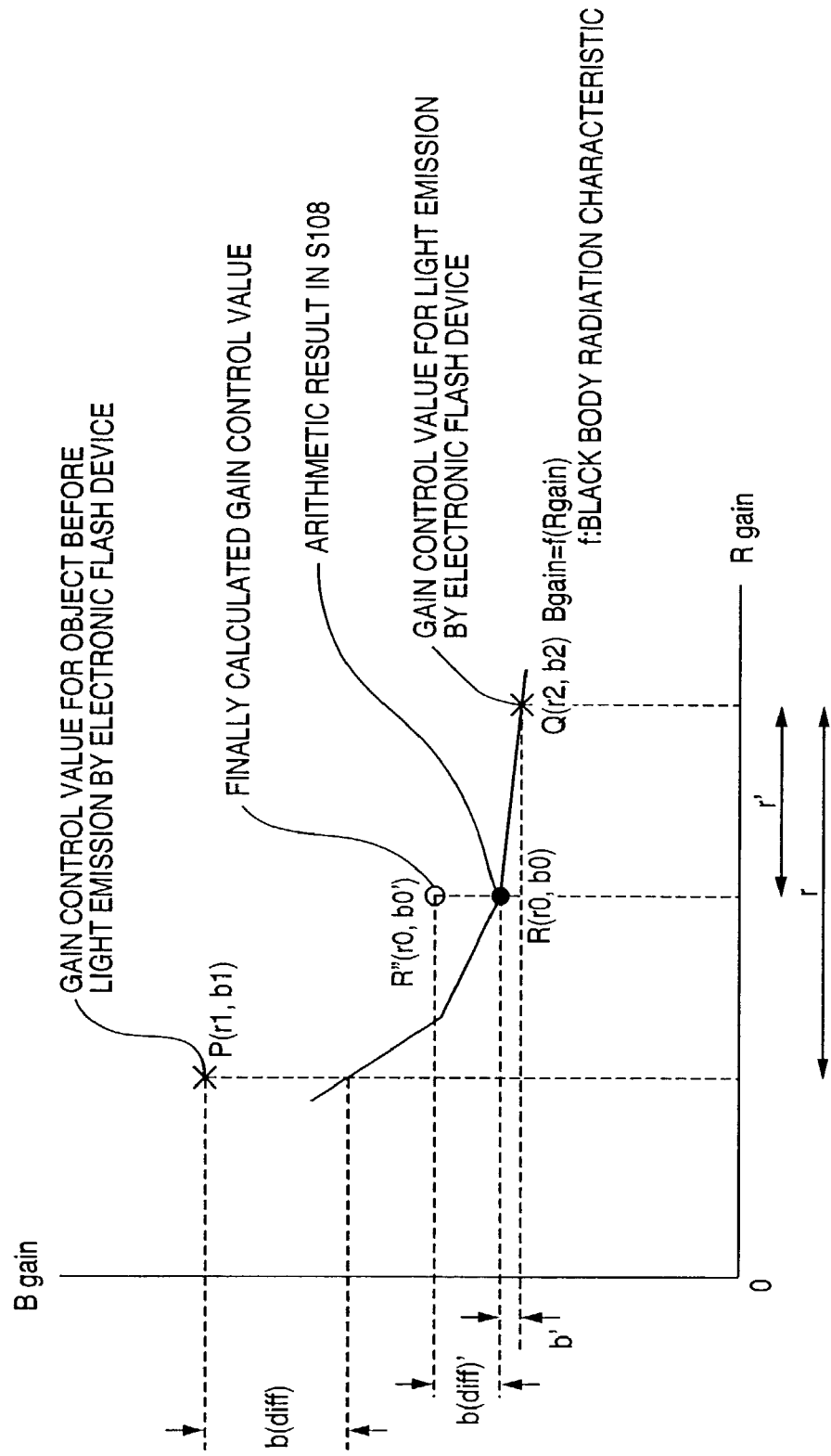
FIG. 5 is a graph showing the correlation of gain control values for R and B signals so as to explain a process of calculating gain control values for actual white balance adjustment under artificial illumination such as a fluorescent lamp.
Figure 6:
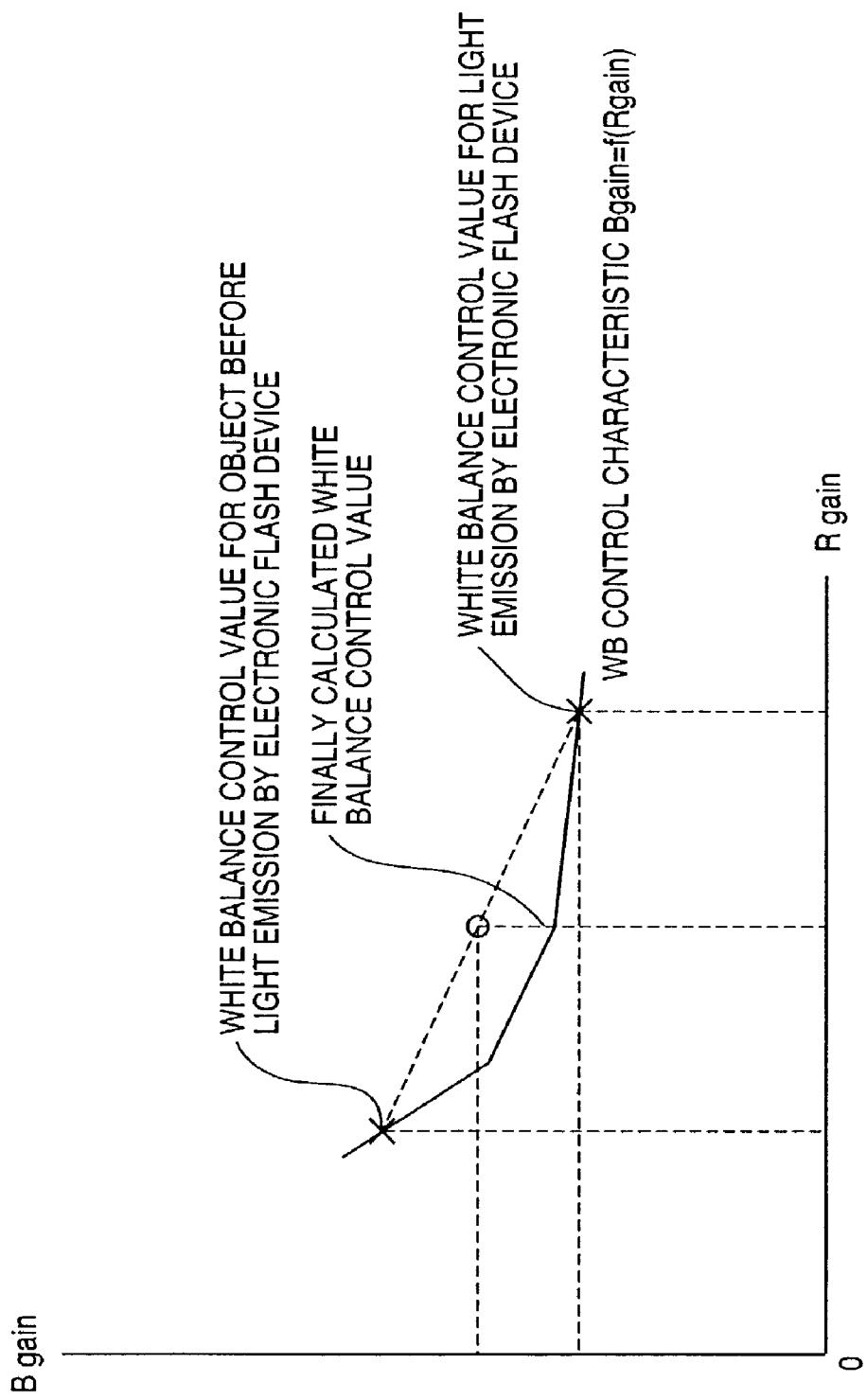
FIG. 6 is a graph showing the correlation of gain control values for R and B signals so as to explain a conventional process of calculating gain control values for actual white balance adjustment.

FIG. 4 is a flow chart showing operation processing for white balance adjustment when the electronic flash device is caused to emit light under artificial illumination. FIG. 5 is a graph showing the correlation of gain control values for R and B signals so as to explain a process of calculating gain control values for actual white balance adjustment when the electronic flash device 213 is caused to emit light under artificial illumination. White balance adjusting operation when the electronic flash device is caused to emit light under artificial illumination will be described with reference to FIGS. 4 and 5. The same step numbers as in FIG. 1 denote the same processing operations in FIG. 4, and a description thereof will be omitted.

Referring to FIG. 5, the gain control values P are calculated on the basis of object light under artificial illumination before light emission by the electronic flash device 213. These values deviate from the black body radiation characteristic indicated by the bold line. When the white balance is adjusted on the basis of the control values R(r0,b0) calculated in step S108 of FIG. 1, the actually adjusted image becomes yellowish. To prevent this, in white balance adjustment under artificial illumination, the gain control values R for actual adjustment are corrected in accordance with the deviation amounts of the gain control values P from the black body radiation characteristic. Whether the gain control values P deviate from the black body radiation characteristic is determined by determining whether the gain control values P obtained in step S102 are located on the function f of the black body radiation characteristic.

In step S108a, let b(diff) be the shift amount of a gain control value component b1 of the gain control value P of the B signal. An amount b(diff)' to be corrected is given by $$b(diff)'=k*b(diff) \quad (4)$$

The value b(diff)' depends on k. That is, the value b(diff)' varies in accordance with the illuminance of the object and the light emission amount of the electronic flash. For example, when the illuminance of the object is relatively high, and the light emission amount of the electronic flash is small, the value b(diff)' becomes large. The white balance control value to be actually controlled becomes close to the white balance control value under artificial illumination. On the other hand, when the illuminance of the object is low, and the light emission amount of the electronic flash is large, the value b(diff)' becomes small. The white balance control value to be actually controlled becomes close to the black body radiation characteristic.

In step S108b, the gain control value for the B signal, which should be shifted from b2 of the gain control value Q, is given by $$b'+b(diff)'$$

Thus, a gain control value b0' for the B signal for actual white balance adjustment is calculated.

In step S109, gain control values R"(r0,b0) obtained in steps S107 and S108b are output to the white balance amplifiers 207r and 207b.

As described above, even when the electronic flash device 213 is caused to emit light under artificial illumination, appropriate white balance adjustment can be done.

In the above-described embodiment, an electronic flash device has been exemplified as a device for illuminating an object. However, any other device for illuminating an object can be used. For example, if the object illumination time is long, the present invention can be applied even to moving image sensing.

In the above-described embodiment, the degree k of influence of the color temperature by light emission of an electronic flash device on the color temperature of an object is calculated from the illuminance of the object before light emission and the light emission amount of the electronic flash device 213. The degree k of influence may be changed in accordance with the distance of the object.

In this embodiment, white balance is adjusted by adjusting gains for the R and B signals. However, white balance may be adjusted by adjusting gains for color difference signals such as R-Y and B-Y signals.

The present invention can be achieved by supplying software program codes for implementing the function of the above-described embodiment to an image sensing apparatus through a network such as the Internet and causing the computer (or a CPU or MPU) of the image sensing apparatus to read out and execute the program codes stored in a storage medium.

In this case, the program codes read out from the storage medium implement the function of the white balance control circuit 212 of the above-described embodiments by themselves, and the storage medium which stores the program codes constitutes the present invention.

As the storage medium for supplying the program codes, for example, a floppy disk, hard disk, optical disk, magnetooptical disk, CD-ROM, CD-R, magnetic tape, nonvolatile memory card, ROM, or the like can be used.

The function of the above-described embodiment is implemented not only when the readout program codes are executed by the computer but also when the OS (Operating System) running on the computer performs part or all of actual processing on the basis of the instructions of the program codes.

The function of the above-described embodiment is also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, it stores program codes corresponding to the above-described flow charts. To put it simply, modules that are indispensable for the image sensing apparatus of the present invention are stored in the storage medium.

As has been described above, according to the above embodiment, when an object is illuminated using an electronic flash device or the like, white balance is adjusted on the basis of white balance gain control values corresponding to the object illuminance and electronic flash light emission amount in conformity with the black body radiation characteristic. Hence, an optimum image can be obtained.

The present invention is not limited to the above embodiments and various changes and modifications can be made within the spirit and scope of the present invention. Therefore, to apprise the public of the scope of the present invention, the following claims are made.

What is claimed is:

1. An image sensing apparatus, comprising:
    an electronic flash device which emits light for an object;
    a first obtaining device which obtains non-flashed gain control values for the object before light emission by said electronic flash device, wherein the non-flashed gain control values include a first color component gain and a second color component gain;

a second obtaining device which obtains flashed gain control values for light emission by said electronic flash device, wherein the flashed gain control values include the first color components gain and the second color components gain;

a ratio computing device which computes a ratio k (0<k<1) which represents the degree of influence of the color temperature of light to be emitted from the electronic flash device;

a first gain computing device which computes a first gain control value for the first color component in accordance with the first color component gain of the non-flashed gain control values, the first color component gain of the flashed gain control values, and the ratio k;

a second gain computing device which computes a second gain control value for the second color component in accordance with a black body radiation characteristic function f(x) in which the first gain control value for the first color component computed by said first gain computing device is used for x; and a control device which controls a white balance for an image of the object in accordance with the first gain control value for the first color component and the second gain control value for the second color component.

2. The image sensing apparatus according to claim 1, wherein the first color component is R, and the second color component is B.

3. The image sensing apparatus according to claim 1, wherein said ratio computing device computes a ratio k on the basis of an object distance.

4. A control method for an image sensing apparatus having an electronic flash device which emits light for an object, said method comprising:

a first obtaining step of obtaining non-flashed gain control values for the object before light emission by said electronic flash device, wherein the non-flashed gain control values include a first color component gain and a second color component gain;

a second obtaining step of obtaining flashed gain control values for light emission by said electronic flash device, wherein the flashed gain control values include the first color components gain and the second color components gain;

a ratio computing step of computing a ratio k (0<k<1) which represents the degree of influence of the color temperature of light to be emitted from the electronic flash device;

a first gain computing step of computing a first gain control value for the first color component in accordance with the first color component gain of the non-flashed gain control values, the first color component gain of the flashed gain control values, and the ratio k;

a second gain computing step of computing a second gain control value for the second color component in accordance with a black body radiation characteristic function f(x) in which the first gain control value for the first color component computed in said first gain computing step is used for x; and a control step of controlling a white balance for a image of the object in accordance with the first gain control value for the first color component and the second gain control value for the second color component.

5. The control method according to claim 4, wherein the first color component is R, and the second color component is B.

6. The control method according to claim 4, wherein said ratio computing step computes a ratio k on the basis of an object distance.

* * * * *